March 30, 1926.
W. S. SNIDER
1,578,859
SOIL PULVERIZER
Original Filed Sept. 27. 1922    4 Sheets-Sheet 1
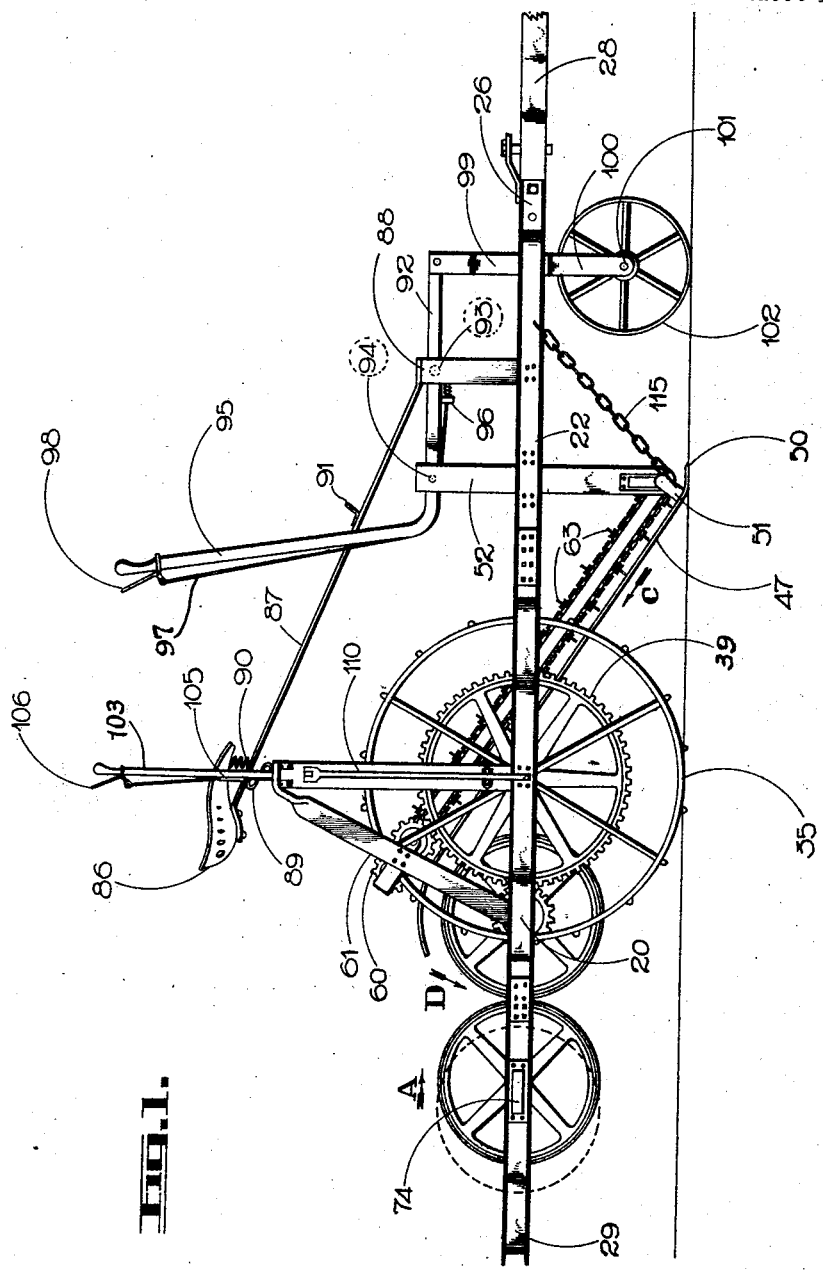
Inventor
WILLIAM S. SNIDER.
By *E.H.Bond*
Attorney

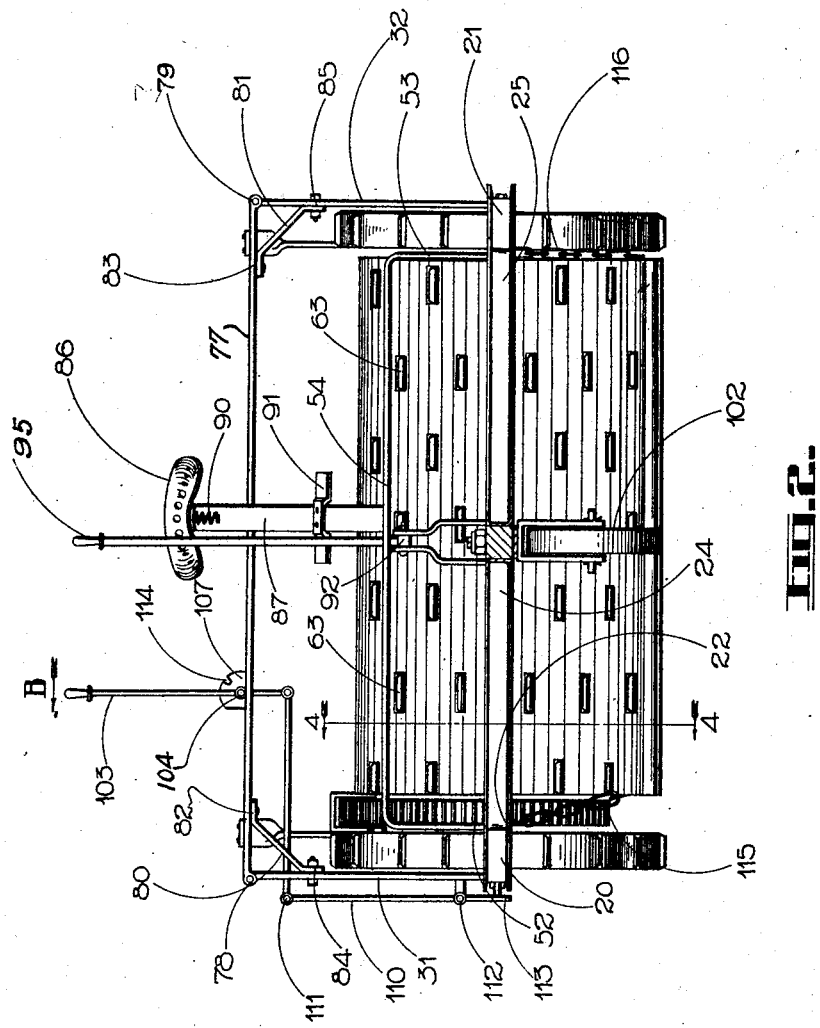

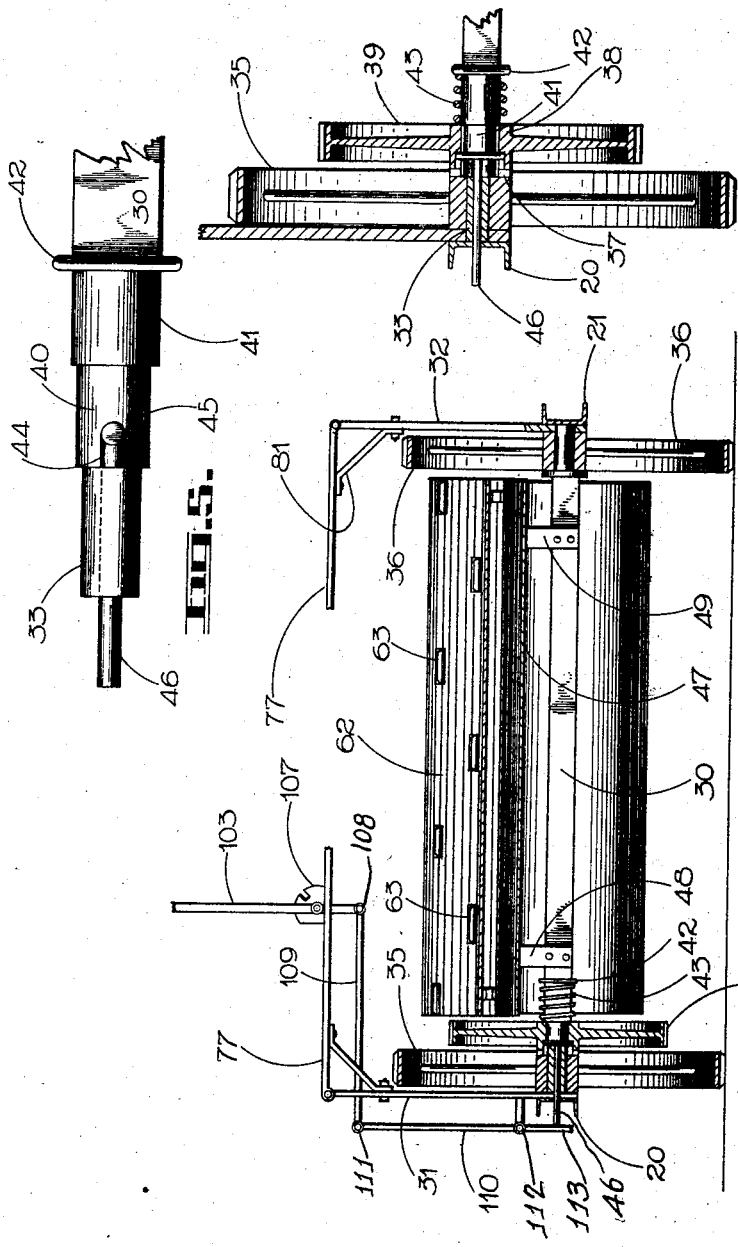

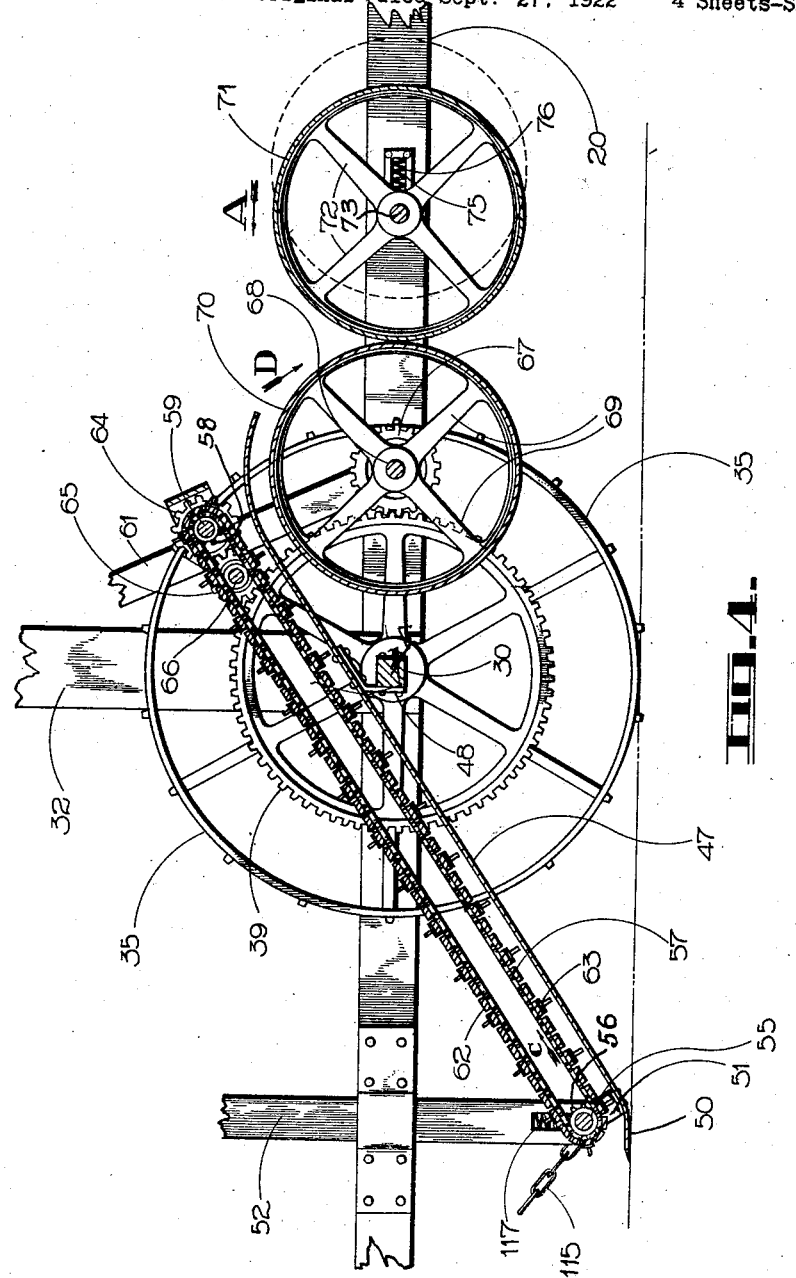

Patented Mar. 30, 1926.

1,578,859

UNITED STATES PATENT OFFICE.

WILLIAM STEPHEN SNIDER, OF CHILLIWACK, BRITISH COLUMBIA, CANADA.

SOIL PULVERIZER.

Application filed September 27, 1922, Serial No. 590,815. Renewed November 5, 1925.

*To all whom it may concern:*

Be it known that I, WILLIAM STEPHEN SNIDER, a citizen of the Dominion of Canada, residing at Chilliwack, in the county of Westminster and Province of British Columbia, have invented certain new and useful Improvements in Soil Pulverizers, of which the following is a specification.

The present invention relates to farming implements and comprehends the provision of an implement especially adapted for the cultivation of soil, which may be specifically defined as a machine wherein clods and lumps of soil are carried up an endless conveyor and deposited intermediate tandem rotary drums, where the clods and soil are subjected to a pulverizing operation, after which the pulverized soil is deposited on the ground in a uniform manner.

The invention resides in the construction and relative arrangement of component parts as will readily appear after a perusal of the following description, the descriptive matter being supplemented by the accompanying schematic illustrations wherein:

Figure 1 is a side elevation of an implement constructed in accordance with my present invention, parts being broken away and sundry elements being illustrated diagrammatically.

Figure 2 is a front elevation thereof.

Figure 3 is a medial vertical transverse section, portions of the component parts being shown in elevation.

Figure 4 is an enlarged fragmentary detail, as it would appear when taken on line 4—4 of Figure 2.

Figure 5 is a fragmentary detail illustrating a portion of the axle construction incorporated in the implement.

Figure 6 is a medial vertical fragmentary detail showing the clutch and drive construction incorporated in the implement.

Referring to the drawings, like numerals of reference designate corresponding parts.

The implement frame proper constitutes side sections 20 and 21 which are detachably connected to the side sections 22 and 23, which sections extend inwardly across the forward extremity of the implements as at 24 and 25. The inwardly extending sections 24 and 25 are then bent at right angles as at 26 and 27 forming a support for the detachably connected pole 28. The U-shaped frame section 29 is detachably connected to the rear of the frame sections 20 and 21. As best shown in Figure 3, the numeral 30 designates the axle of the implement which is preferably constructed square and which is substantially mounted in the vertical frame members 31 and 32 rigidly connected to the side sections 20 and 21. The numerals 33 and 34 designate skeins which are turned on the outer extremities of the axle 30 and have rotatably mounted thereon, the drive wheel 35 and the supporting wheel 36.

As best shown in Figure 6, the inner face of the hub of the drive wheel 35 is serrated as at 37 for engagement with the contiguous serrated face of the hub 38 of the spur 39 which is rotatably mounted on the skein 40 of the axle 30. The numeral 41 designates an annular portion of the axle 30 which has a flange 42 disposed at the inner extremity thereof. The numeral 43 designates a coil spring disposed over the annular portion 41 of the axle 30 and intermediate the hub 38 of the spur gear 39 and the flange 42 of the axle 30. As best shown in the Figure 5, the numeral 44 designates an elongated vertical opening configurated in the skein 40 which has extended therethrough, and seated in the hub 38 of the spur gear 39 a pin 45, which is capable of horizontal reciprocation in the said elongated opening 44. The numeral 46 designates a horizontal rod which is loosely mounted centrally in the skein 33 of the axle 30 and the inner extremity thereof abuts against the vertical pin 45, the outer extremity thereof extending through the sections 20 of the frame. This mechanism constitutes the clutch, the operation of which will be hereinafter described.

The axle 30 supports the carrier platform 47 through the medium of the brackets 48 and 49. The lower extremity 50 of the carrier platform is bent in horizontal plane, forming what may be termed a scoop. Two brackets, one of which is shown in Figure 1 and designated by the numeral 51, are substantially mounted on the carrier platform 47 and are rigidly connected to the lower extremities of the conveyor regulating yoke constituting the lateral sections 52 and 53, the upper extremities of which are connected by the horizontal member 54 integral therewith. The transverse shaft 55, best shown in Figure 4, is journalled in the lower extremities of the sections 52 and 53 and has mounted on the outer ends thereof, dual sprockets, one of which is shown in Figure 4 being designated by the numeral 56.

Trained over the said sprockets are the dual chains 57, the opposite extremities of which are trained over the dual sprockets 58 mounted on the outer extremities of the transverse shaft 59 rotatably journalled in the dual brackets 60 carried by the dual braces 61. A plurality of transverse rectangular strips 62 are substantially connected to the dual chains 57, thus forming an endless conveyor having mounted on the outer surface thereof, a plurality of gripping lugs 63 disposed in staggered formation.

On the outer extremity of the transverse shaft 59, a pinion designated by the numeral 64 is keyed, the said pinion being driven by the spur gear 39 through the medium of the intermediate pinion 65, which is keyed on the outer extremity of the transverse shaft 56, which is also journalled in the dual brackets 60 in spaced relation to the transverse shaft 59.

As best shown in Figure 4, the spur gear 39 drives the pinion 67 keyed on the outer extremity of the transverse shaft 68, the terminals of which are journalled in suitable bearings mounted on the side sections 20 and 21 of the frame. The numerals 69 designate spokes which are substantially mounted on the outer extremities of the transverse shaft 68 and carry the cylindrical drum 70 which coincides with the cylindrical drum 71 carried by the spokes 72 mounted on the outer extremities of the transverse shaft 73 which is mounted in the brackets 74. Each bracket has disposed therein an elongated opening 75 into which the outer extremities of the transverse shaft 73 extend. The numerals 76 designate coil springs disposed in the said elongated opening 75 for the purpose of tensioning the said shaft 73 and the drum 71 in the direction as indicated by the arrow A. Through this medium, it will be discerned that the drum 71 is capable of withdrawal from and retraction to the drum 70, if stones or other like impediment should be deposited intermediate the same during the pulverizing operation.

To the upper extremities of the side members 31 and 32, the transverse member 77 is hingedly connected as at 78 and 79 for the purpose of facilitating dismantling of the implement. The numerals 80 and 81 designate braces being substantially connected to the transverse member 77 as at 82 and 83 and detachably connected to the vertical members 31 and 32 as at 84 and 85. The numeral 86 designates the seat which will be occupied by the operator, the same being of conventional construction. The seat 86 is mounted on the upper extremity of the bar 87, the lower extremity of which is substantially mounted on the frame 88 which is rigidly mounted on the side members 22 and 23 of the frame proper. To provide resiliency, the bar 87 is disposed intermediate the springs 89 and 90. The numeral 91 designates a foot rest mounted on the bar 87 in relation to the seat 86, being capable of adjustment on the bar 87 to compensate for operators of varied stature.

The numeral 92 designates a fulcrum arm fulcrumed intermediate its terminals as shown in dotted position and designated by the numeral 93 and having pivotally connected to the rear extremity thereof, yoke frame 52 in a pivotal manner, as shown in dotted position and designated by the numeral 94. The numeral 95 designates a lever formed integral with the fulcrum arm 92. To maintain normal stability of the fulcrum arm 92, I provide the dog 96 adapted to engage with a rack carried by the frame 88, the dog being controlled through the medium of the connecting wire or cable 97, the same being actuated through the medium of the hand grip lever 98. The forward extremity of the lever arm 92 carries yoke 99 free to reciprocate vertically in the frame of the implement and has pivotally mounted in the lower extremity thereof, the yoke 100 which carries the axle pin 101, carrying the rotatable supporting wheel 102.

The clutch controlling mechanism constitutes the lever 103 carried adjacent the operator's seat 86 and being pivotally mounted intermediate its terminals as at 104. The lever arm 103 carries the dog 105 which is controlled by the hand grip lever 106 and which is capable of engagement with the rack 107. Connected to the lower extremity of the lever arm 103 as at 108 is the connecting rod 109 connected to the vertical rod 110 as at 111. The vertical rod 110 is fulcrumed intermediate its terminals as at 112, the lower extremity 113 of which is adapted for coincidence with the outer extremity of the clutch operating rod 46. In operation, the implement will be drawn by draught animals or motive power which will be connected to the pole 28.

In the transportation of the implement, the dog 105 of the lever 103 is engaged with the recess 114 of the rack 107 and in this position, the clutch will be disengaged and the implement may be drawn without the necessity of the conveying and pulverizing mechanism operating. When it is desired to perform the pulverizing operation, the lever arm 103 will be shifted in the direction of the indicating arrow B. The rod 46 is thus withdrawn, the coil spring 43 tensioning the spur gear 39 outwardly, with the result that the coinciding serrated faces of the hub of the drive wheel and the spur gear will engage. The rotary movement of the drive wheel 35 is transmitted to the spur gear 39, which through the medium of the intermediate pinion 65 and the pinion 64 will cause the transverse shaft 59 to rotate. It will be readily discerned that the actuation of the transverse shaft 59 will, through the medium of the sprockets and chains as previously described, cause the endless conveyor to travel in the direction of the indicating arrow C shown in Figure 1. The scoop of the conveyor platform 47 will then be adjusted to coincide with the surface of the ground. Earth and clods will be scooped upon the conveyor platform 47 and carried up the same through the medium of the gripping lug 63 of the endless conveyor. The continuous travel of the earth and clods up the platform 47 will deposit the same intermediate the pulverizing drums 70 and 71 as designated by the indicating arrow D and the earth and clods falling on the same will be compressed in such a manner as to pulverize the same. After the pulverizing operation, the earth falls from the drums and is deposited in the ground in a uniform manner. It will be readily discerned that the amount of earth and clods which will be scooped up by the scoop 50 of the conveyor platform 47 may be controlled through the medium of the lever 95.

It is obvious that the scoop 50 may strike an embedded rock or similar obstruction. To maintain stability of the conveyor platform 47, I provide the chains 115 and 116 which are connected to the dual brackets 51 carried by the said conveyor platform 47 and the upper extremities thereof are rigidly connected to the sections 22 and 23 of the frame. It will be discerned that the lower extremity of the elevator is capable of elevation independently, the transverse shaft 55 reciprocating vertically in the vertical openings. The said shaft 55 is normally tensioned downwardly by the coil springs designated by the numerals 117.

This implement is very desirable for destroying premature weeds and also for summer fallowing. It will be readily discerned that the use of this implement will pulverize the soil and prevent detrimental evaporation of the moisture contained therein.

From the foregoing, it will be obvious that I have provided an implement which is practical and in every way desirable. While it is believed that from the foregoing description, the nature and advantages of my invention will be readily apparent, I do not wish to be confined to the embodiment of my invention as disclosed, but claim all rights to deviations from such detail as defined by the spirit of the appended claims.

What I claim as new is:—

1. An implement of the character described, comprising a wheeled frame, a conveyor carried thereby, means for actuating the conveyor, a conveyor platform disposed beneath the conveyor, means for elevating the forward extremities of the conveyor and platform independently of each other, the lower end of said platform being bent to form a scoop, a yielding means bearing on the shaft at the lower end of the conveyor, and a conveyor-regulator member depending from the said frame.

2. An implement of the character described comprising a wheel-supported frame, a conveyor, a conveyor platform beneath the conveyor, with its lower end bent to form a scoop, a yielding support for the shaft of the lower end of the conveyor, a conveyor-regulator yoke depending from the frame, and brackets carried by said platform and connected to the said yoke.

In testimony whereof, I affix my signature.

WILLIAM STEPHEN SNIDER.